US012354508B2

(12) United States Patent
Ikeda et al.

(10) Patent No.: US 12,354,508 B2
(45) Date of Patent: Jul. 8, 2025

(54) VIDEO-AUDIO OUTPUT MODULE AND VIDEO-AUDIO PRESENTATION APPARATUS

(71) Applicant: Sony Group Corporation, Tokyo (JP)

(72) Inventors: Takuji Ikeda, Tokyo (JP); Takeshi Yamamoto, Tokyo (JP)

(73) Assignee: Sony Group Corporation (JP)

( * ) Notice: Subject to any disclaimer, the term of this patent is extended or adjusted under 35 U.S.C. 154(b) by 129 days.

(21) Appl. No.: 18/275,513

(22) PCT Filed: Jan. 6, 2022

(86) PCT No.: PCT/JP2022/000170
§ 371 (c)(1),
(2) Date: Aug. 2, 2023

(87) PCT Pub. No.: WO2022/181065
PCT Pub. Date: Sep. 1, 2022

(65) Prior Publication Data

US 2024/0119871 A1 Apr. 11, 2024

(30) Foreign Application Priority Data

Feb. 25, 2021 (JP) ................................ 2021-028070

(51) Int. Cl.
*G09F 9/33* (2006.01)
*H04R 1/02* (2006.01)

(52) U.S. Cl.
CPC ............... *G09F 9/33* (2013.01); *H04R 1/028* (2013.01)

(58) Field of Classification Search
CPC ........ G09F 9/33; H04R 1/028; G02F 1/13452
See application file for complete search history.

(56) References Cited

U.S. PATENT DOCUMENTS 7,173,678 B2 * 2/2007 Havelka ................ G06F 1/1601 349/60
8,405,994 B2 * 3/2013 Kinoe ............... G02F 1/133385 349/110

(Continued)

FOREIGN PATENT DOCUMENTS

JP S62296922 A 12/1987
JP 2007170067 A 7/2007

(Continued)

OTHER PUBLICATIONS

International Search Report for PCT/JP2022/000170 mailed Mar. 8, 2022. 3 pages.

*Primary Examiner* — Hoi C Lau
(74) *Attorney, Agent, or Firm* — Lerner David LLP

(57) ABSTRACT

The video-audio output module includes a display board having a display surface for displaying a video image and a mount surface facing opposite the display surface, with drive chips mounted on the mount surface for driving the display surface to display the video image, a heat radiation plate fixed to the mount surface of the display board with a heat-conductive filler material of high heat conductivity interposed therebetween, the heat radiation plate including a material of high heat conductivity, and an audio device fixed to the heat radiation plate, the audio device being vibratable in response to an audio signal applied thereto. The present technology is applicable, for example, to a video-audio presentation apparatus that displays a video image while localizing sound images such that sounds are output from images representing sound sources.

12 Claims, 13 Drawing Sheets

(56) References Cited

U.S. PATENT DOCUMENTS

| | | | | |
|---|---|---|---|---|
| 2005/0046618 | A1* | 3/2005 | Kim | H05K 7/20963 345/60 |
| 2006/0001821 | A1* | 1/2006 | Dewa | G02F 1/13452 349/150 |
| 2006/0268511 | A1* | 11/2006 | Jeong | H05K 7/20963 361/690 |
| 2016/0165748 | A1* | 6/2016 | Chen | B23P 15/26 29/890.03 |
| 2018/0040541 | A1* | 2/2018 | Choi | H01L 23/3114 |
| 2020/0196496 | A1* | 6/2020 | Shin | G06F 1/203 |
| 2020/0404808 | A1* | 12/2020 | Kim | H04R 9/022 |
| 2021/0391636 | A1* | 12/2021 | Kang | H01Q 1/02 |
| 2024/0103326 | A1* | 3/2024 | Iwai | G02F 1/133615 |
| 2024/0119871 | A1* | 4/2024 | Ikeda | H04R 1/028 |
| 2024/0121926 | A1* | 4/2024 | Ishida | H05K 7/20963 |
| 2025/0036175 | A1* | 1/2025 | Park | G06F 1/203 |

FOREIGN PATENT DOCUMENTS

| | | | |
|---|---|---|---|
| JP | 2009077366 | A | 4/2009 |
| JP | 2012235426 | A | 11/2012 |
| JP | 2021018436 | A | 2/2021 |
| WO | 2013105347 | A1 | 7/2013 |
| WO | 2018123292 | A1 | 7/2018 |

* cited by examiner

VIDEO-AUDIO OUTPUT MODULE AND VIDEO-AUDIO PRESENTATION APPARATUS

CROSS-REFERENCE TO RELATED APPLICATIONS

This application is a national phase entry under 35 U.S.C. § 371 of International Application No. PCT/JP2022/000170 filed Jan. 6, 2022, which claims the priority from Japanese Patent Application No. 2021-028070 filed in the Japanese Patent Office on Feb. 25, 2021, the entire contents of which are hereby incorporated by reference.

TECHNICAL FIELD

The present disclosure relates to a video-audio output module and a video-audio presentation apparatus, and more particularly to a video-audio output module and a video-audio presentation apparatus that are designed for increased performance.

BACKGROUND ART

In the past, there has been developed a large-screen display apparatus that displays video images by energizing LEDs (Light Emitting Diodes) disposed at respective pixels.

Furthermore, PTL 1 discloses a technology in which multiple speakers are disposed behind a display section of such a large-screen display apparatus for localizing a sound image synchronized with a video image at any position on the screen.

CITATION LIST

Patent Literature

[PTL 1]
JP 2012-235426A

SUMMARY

Technical Problem

Incidentally, a large-screen display apparatus as described above are expected to have a structure including many drive chips installed for driving the LEDs on account of attempts made to achieve improved performance by way of lower pitch and higher luminance predicted as market trends in future. With such a structure, the large-screen display apparatus are required to have a structure capable of outputting good sounds and to take appropriate heat radiation measures. Therefore, it is necessary for large-screen display apparatus to incorporate appropriate heat radiation measures and to be designed for increased performance.

The present disclosure has been made under such circumstances and attempts to achieve better performance.

Solution to Problem

A video-audio output module according to an aspect of the present disclosure includes a display board having a display surface for displaying a video image and a mount surface facing opposite the display surface, with drive chips mounted on the mount surface for driving the display surface to display the video image, a heat radiation plate fixed to the mount surface of the display board with a heat-conductive filler material of high heat conductivity interposed therebetween, the heat radiation plate including a material of high heat conductivity, and an audio device fixed to the heat radiation plate, the audio device being vibratable in response to an audio signal applied thereto.

According to the aspect of the present disclosure, the drive chips for driving the display surface to display a video image are mounted on the mount surface that faces opposite the display surface for displaying the video image, the heat radiation plate including a material of high heat conductivity is fixed to the mount surface of the display board with the heat-conductive filler material of high heat conductivity interposed therebetween, and the audio device that is vibratable in response to an audio signal applied thereto is fixed to the heat radiation plate.

A video-audio presentation apparatus according to an aspect of the present disclosure includes a video-audio output module having a display board having a display surface for displaying a video image and a mount surface facing opposite the display surface, with drive chips mounted on the mount surface for driving the display surface to display the video image, a heat radiation plate fixed to the mount surface of the display board with a heat-conductive filler material of high heat conductivity interposed therebetween, the heat radiation plate including a material of high heat conductivity, and an audio device fixed to the heat radiation plate, the audio device being vibratable in response to an audio signal applied thereto, and a main plate to which the multiple video-audio output modules are fixed in a tiled layout.

According to the aspect of the present disclosure, in the video-audio output module, the drive chips for driving the display surface to display a video image are mounted on the mount surface that faces opposite the display surface for displaying the video image, the heat radiation plate including a material of high heat conductivity is fixed to the mount surface of the display board with the heat-conductive filler material of high heat conductivity interposed therebetween, and the audio device that is vibratable in response to an audio signal applied thereto is fixed to the heat radiation plate. The multiple video-audio output modules are fixed to the main plate in a tiled layout.

DESCRIPTION OF EMBODIMENT

A specific embodiment to which the present technology is applied will be described in detail hereinbelow with reference to the drawings.

<Structural Example of Video-Audio Presentation Apparatus>

Figure 1:
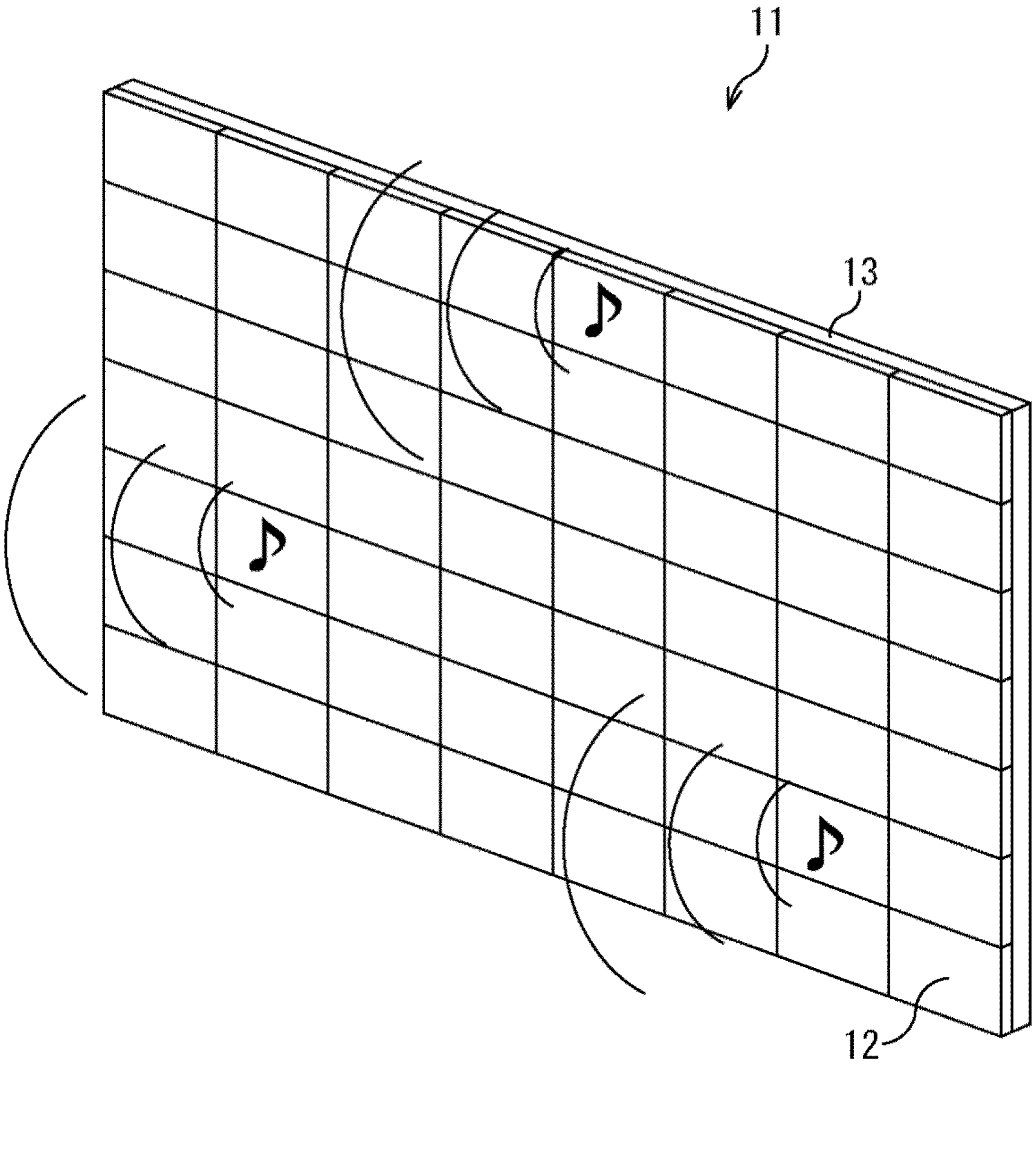
FIG. 1 is a view illustrating a structural example of an embodiment of a video-audio presentation apparatus to which the present technology is applied.

FIG. 1 is a view illustrating a structural example of an embodiment of a video-audio presentation apparatus to which the present technology is applied.

As illustrated in FIG. 1, a video-audio presentation apparatus 11 includes multiple video-audio output modules 12 arranged in a tiled layout with no gaps therebetween and fixed to a main plate 13. The video-audio output modules 12 display one large-screen video image in their entirety. Furthermore, the video-audio output modules 12 are individually capable of outputting sounds independently, so that the video-audio presentation apparatus 11 can bring images and sound sources into alignment by outputting sounds from the video-audio output modules 12 that display images representing sound sources in the entire video image. In other words, the video-audio presentation apparatus 11 can localize sound images such that sounds are output from images (e.g., illustrated musical notes) representing sound sources.

<Structural Example of Video-Audio Output Module>

A structural example of the video-audio output modules 12 will be described below with reference to FIGS. 2 and 3.

Figure 2:
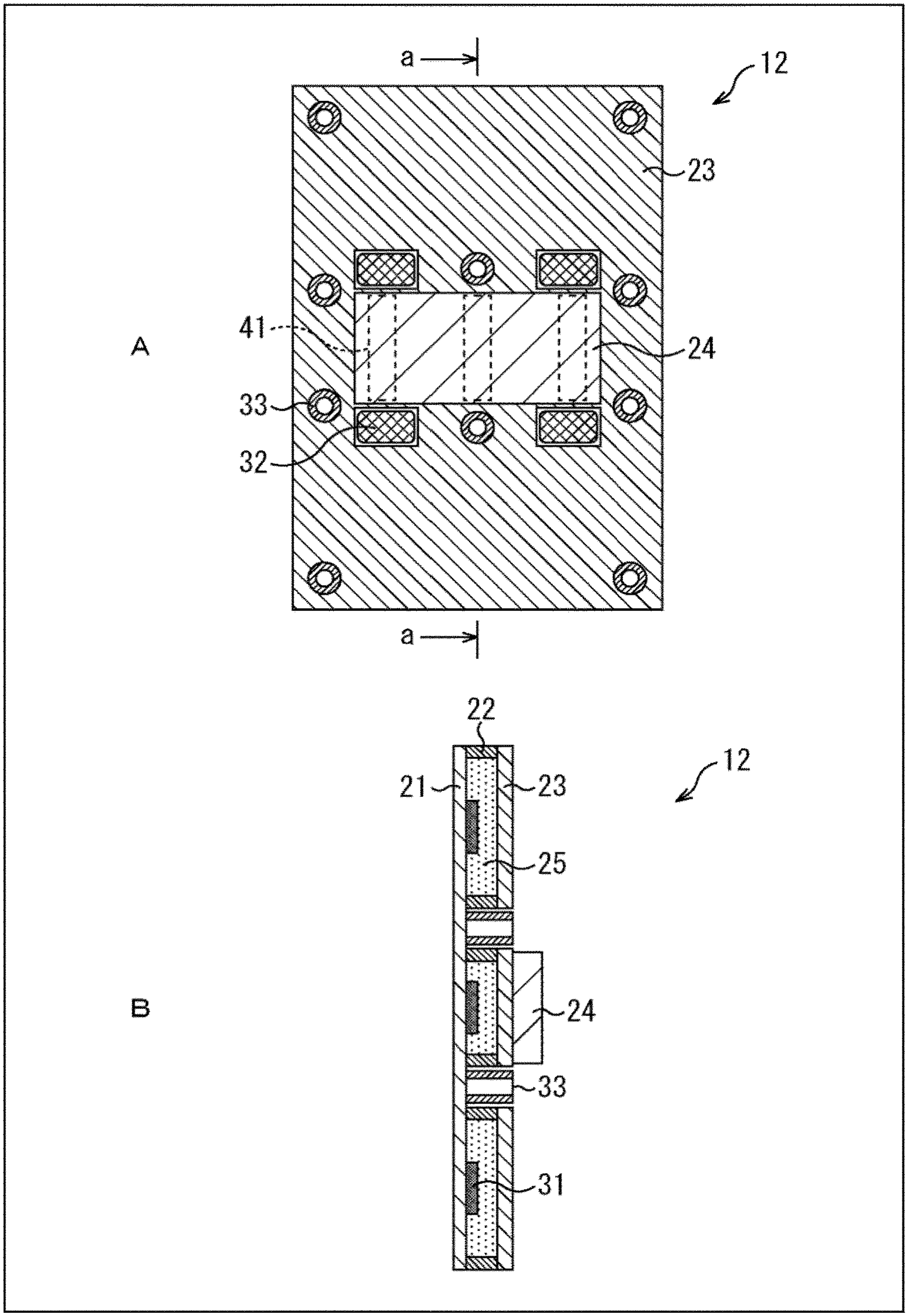
FIG. 2 is a view illustrating, in plan and cross section, a structural example of a video-audio output module.
Figure 3:
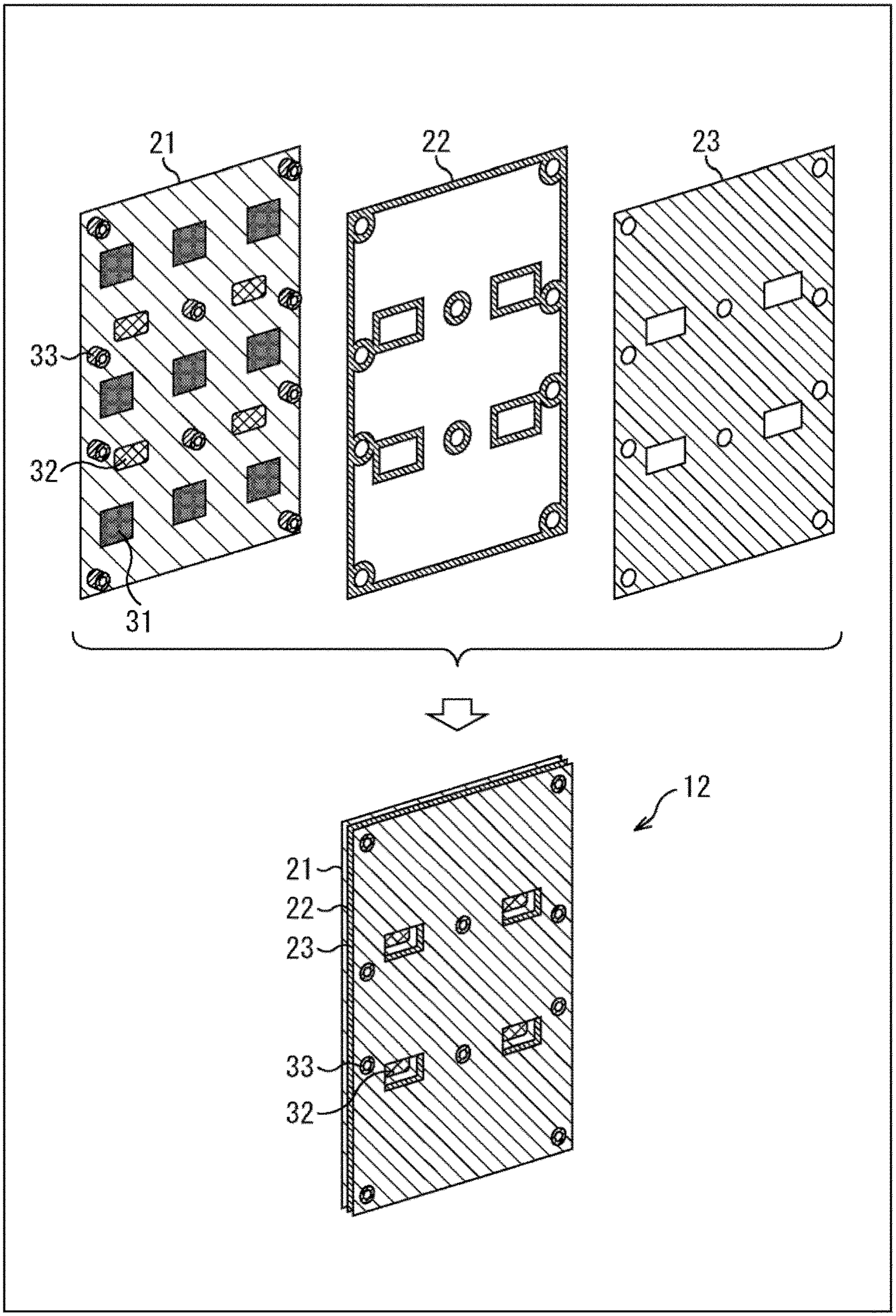
FIG. 3 is a view explanatory of a layered structure of the video-audio output module.

FIG. 2 is a view illustrating, in plan and cross section, a structural example of a video-audio output module 12, and FIG. 3 is a view explanatory of a layered structure of the video-audio output module 12.

A in FIG. 2 illustrates an example of a planar structure of the video-audio output module 12 as viewed from its side fixed to the main plate 13. B in FIG. 2 illustrates an example of a sectional structure of the video-audio output module 12 taken along line a-a illustrated in FIG. 2.

As illustrated in FIG. 2, the video-audio output module 12 includes an LED board 21, a packing 22, a heat radiation plate 23, an audio device 24, and a heat-conductive adhesive 25. As illustrated in FIG. 3, the video-audio output module 12 is of such a structure that the LED board 21 and the heat radiation plate 23 are layered with the packing 22 sandwiched therebetween.

The LED board 21 has multiple LED elements that represent respective video image pixels, disposed in an array on a display surface (a surface facing the left side in B in FIG. 2) for displaying a video image. Drive chips 31 for driving the LED elements are mounted on a mount surface of the LED board 21 that faces opposite the display surface. For example, in the structural example illustrated in FIG. 3, nine drive chips 31 are mounted on the mount surface of the LED board 21 in a 3×3 layout.

Multiple connectors 32 (four connectors 34 in the structural example illustrated in A in FIG. 2) are mounted on the mount surface of the LED board 21. For example, the connectors 32 are used to connect signal lines that supply electric signals representing video signals or the like to the video-audio output module 12.

Multiple studs 33 having internally threaded hollow cylindrical inner surfaces are disposed on the mount surface of the LED board 21. The studs 33 are used to fix the video-audio output module 12 to the main plate 13. In the structural example illustrated in A in FIG. 2, ten studs 33 are provided. For example, the studs 33 include four studs provided near and along each of left and right sides of the video-audio output module 12 and one stud on each of upper and lower sides of a position where the audio device 24 is disposed centrally in the video-audio output module 12.

The packing 22 acts as a seal member having a thickness equal to or larger than the thickness of the drive chips 31 mounted on the mount surface of the LED board 21, and is used to prevent the heat-conductive adhesive 25 that fills a space between the LED board 21 and the heat radiation plate 23 from leaking. For example, as illustrated in FIG. 3, the packing 22 is formed to a shape corresponding to the outer peripheries of the LED board 21 and the heat radiation plate 23, the outer peripheries of the studs 33, and the outer peripheries of the connectors 32. Consequently, the packing 22 is able to prevent the heat-conductive adhesive 25 from leaking not only from side faces of the video-audio output module 12 but also from openings defined in the heat radiation plate 23 in alignment with the studs 33 and the connectors 32.

The heat radiation plate 23 includes a material having high heat conductivity such as aluminum, for example. The heat radiation plate 23 radiates the heat generated by the drive chips 31 on the LED board 21. The heat radiation plate 23 has openings defined therein at positions where the connectors 32 and the studs 33 are disposed on the LED board 21, the openings corresponding in shape to the connectors 32 and the studs 33.

The audio device 24 may include a piezoelectric element that produces a strain depending on a voltage applied thereto, for example. The audio device 24 is supplied with an audio signal according to a sound source represented by an image displayed by the video-audio output module 12. When the audio device 24 is vibrated by the audio signal, the video-audio output module 12 vibrates in its entirety, outputting sounds.

For example, the audio device 24 is fixed to the heat radiation plate 23 by being affixed thereto using adhesive tapes 41 with double-sided adhesive bonding capability. According to the structural example illustrated in A in FIG. 2, the audio device 24 is fixed to the heat radiation plate 23 by the adhesive tapes 41 affixed at three locations. Alternatively, the audio device 24 may have an entire surface affixed or may be affixed by a fixing method that uses an adhesive, screws, or the like.

The heat-conductive adhesive 25 includes an adhesive of high heat conductivity, for example, and includes a heat-conductive filler material that fills the space between the LED board 21 and the heat radiation plate 23 for transferring the heat generated by the LED board 21 to the heat radiation plate 23. For example, when the heat-conductive adhesive 25 is cured after it has filled the space between the LED board 21 and the heat radiation plate 23, the heat-conductive adhesive 25 bonds the LED board 21 and the heat radiation plate 23 to each other.

The video-audio output module 12 is constructed as described above. Even though the video-audio output module 12 has many drive chips 31 mounted on the mount surface of the LED board 21 due to attempts made to achieve improved performance by way of lower pitch and higher luminance of video images, the video-audio output module 12 is able to output good sounds and take appropriate heat radiation measures. In other words, even with the structure in which the drive chips 31 are too many to obtain an area for installing the audio device 24 on the LED board 21, the video-audio output module 12 can output sounds. Moreover, since the LED board 21 and the heat radiation plate 23 are bonded to each other by the heat-conductive adhesive 25, the heat radiation plate 23 can well radiate the heat generated by the drive chips 31. In other words, the video-audio output module 12 allows the video-audio presentation apparatus 11 that can localize sound images such that sounds are output from images representing sound sources to have better performance.

Incidentally, in the present embodiment, the structural example in which the heat radiation plate 23 is bonded to the LED board 21 by the heat-conductive adhesive 25 is described. However, various methods other than the adhesive bonding may be used to fix the heat radiation plate 23 in covering relation to the mount surface of the LED board 21. For example, there may be used a method of affixing an adhesive tape with double-sided adhesive bonding capability to the packing 22 and securing the LED board 21 and the heat radiation plate 23 to each other through the packing 22, or a method of securing the LED board 21 and the heat radiation plate 23 to each other using screws or the like. In the case of such methods, it is preferable to apply a non-adhesive heat-conductive filler material (e.g., a gap filler having high heat conductivity or the like) that embeds surface irregularities of the mount surface of the LED board 21 and solidifies, and fix the heat radiation plate 23 to the mount surface of the LED board 21.

<Process of Assembling Video-Audio Output Modules>

A process of assembling the video-audio output module 12 will be described below with reference to FIG. 4.

Figure 4:
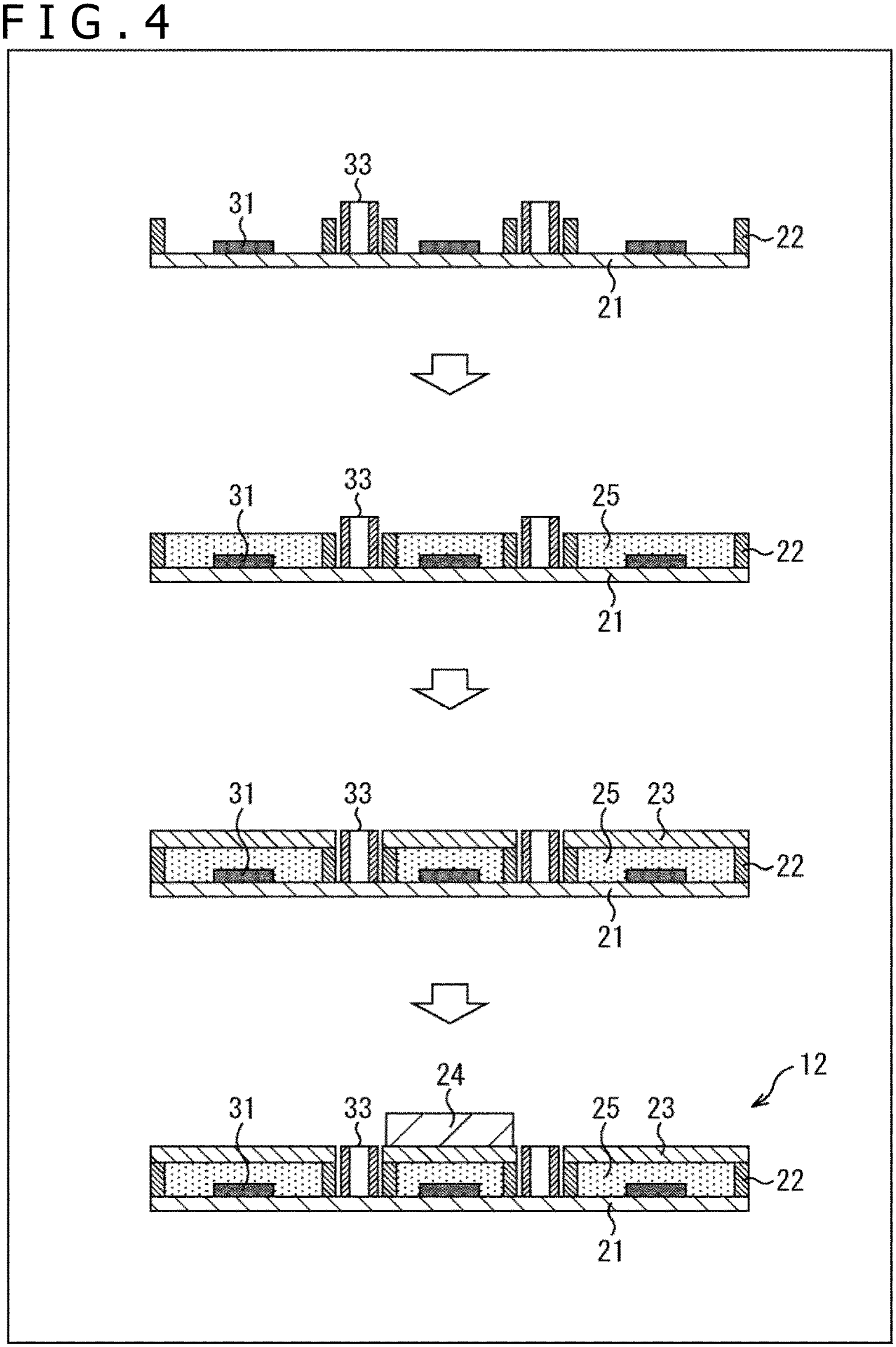
FIG. 4 is a view explanatory of a process of assembling the video-audio output module.

As illustrated in a first stage of FIG. 4, the packing 22 is placed on the mount surface of the LED board 21 on which the drive chips 31 and the studs 33 have been mounted.

As illustrated in a second stage of FIG. 4, the heat-conductive adhesive 25 is applied to fill the space over the mount surface of the LED board 21 within the packing 22.

As illustrated in a third stage of FIG. 4, the heat radiation plate 23 is placed over the LED board 21 such that the studs 33 extend through the through holes in the heat radiation plate 23, and the LED board 21 and the heat radiation plate 23 are fixed to each other by the heat-conductive adhesive 25.

As illustrated in a fourth stage of FIG. 4, the adhesive tapes 41 (see A in FIG. 2) are affixed to a predetermined central area of the heat radiation plate 23, and the audio device 24 is affixed to the heat radiation plate 23 using the adhesive tapes 41, thereby securing the audio device 24 to the heat radiation plate 23.

The video-audio output module 12 can be assembled according to the above process. The heat radiation plate 23 has a small air bleeder hole defined therein. When the heat radiation plate 23 is placed over the LED board 21 and the heat-conductive adhesive 25 is then pressed to a predetermined thickness, air trapped between the heat radiation plate 23 and the heat-conductive adhesive 25 is vented through the small air bleeder hole. The heat conduction ability is thus prevented from being lowered by air because no air is trapped between the heat radiation plate 23 and the heat-conductive adhesive 25.

<Process of Securing Video-Audio Output Modules>

A process of securing the video-audio output module 12 to the main plate 13 will be described below with reference to FIGS. 5 and 6.

Figure 5:
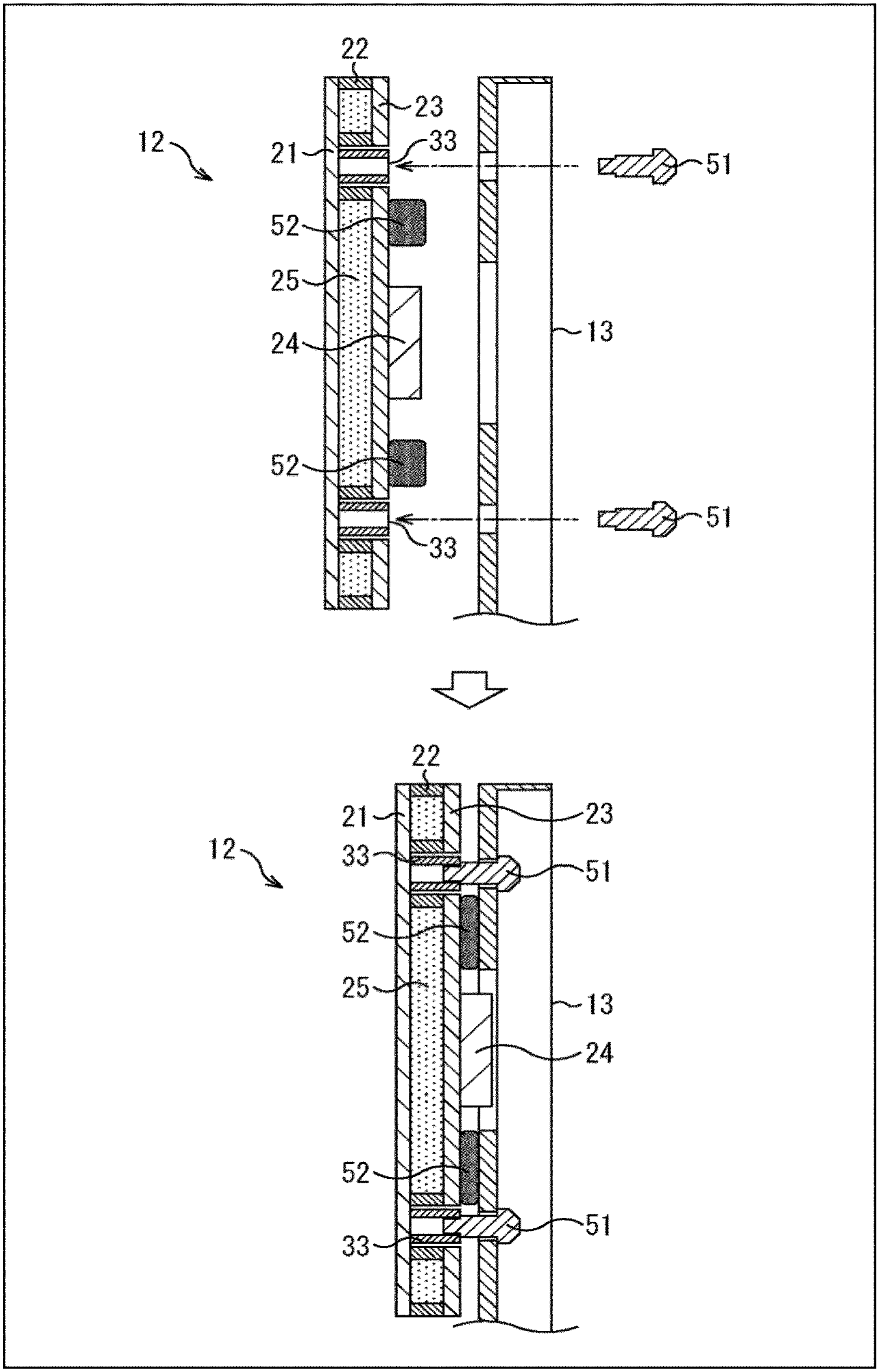
FIG. 5 is a view explanatory of a fixing method using stepped screws.

For example, FIG. 5 illustrates an example of a fixing process of fixing the video-audio output module 12 to the main plate 13, using stepped screws 51.

As illustrated in FIG. 5, the main plate 13 has through holes defined therein through which the stepped screws 51 can be inserted, in alignment with the studs 33. The stepped screws 51 are inserted through the through holes in the main plate 13 and their externally threaded surfaces are threaded into the internally threaded surfaces of the studs 33, thereby securing the video-audio output module 12 to the main plate 13. Furthermore, the main plate 13 has an opening defined therein that is larger than the audio device 24, in alignment with the audio device 24 of the video-audio output module 12. Incidentally, by using studs 33 that have such a length as to provide as large a gap between the video-audio output module 12 and the main plate 13 as the illustrated gap, the video-audio output module 12 can be fixed to the main plate 13 using ordinary screws in place of the stepped screws 51.

When the video-audio output module 12 is to be fixed to the main plate 13, heat-conductive members 52 having heat conductivity and high cushioning ability are sandwiched between the video-audio output module 12 and the main plate 13. The heat-conductive members 52 are able to conduct heat efficiently from the heat radiation plate 23 to the main plate 13, which includes a metal member, thereby achieving a much better heat radiation capability.

Further, the cushioning ability of the heat-conductive members 52 prevents the main plate 13 from being resistive to vibrations produced at the time the video-audio output module 12 outputs sounds. In other words, the fixing process of fixing the video-audio output module 12 to the main plate 13 with the heat-conductive members 52 interposed therebetween allows the video-audio output module 12 to vibrate freely, reducing adverse effects such as a reduction in the sound pressure, for example. In this manner, the video-audio output module 12 is retrained from reducing its audio performance and is able to increase heat radiation performance.

Figure 6:
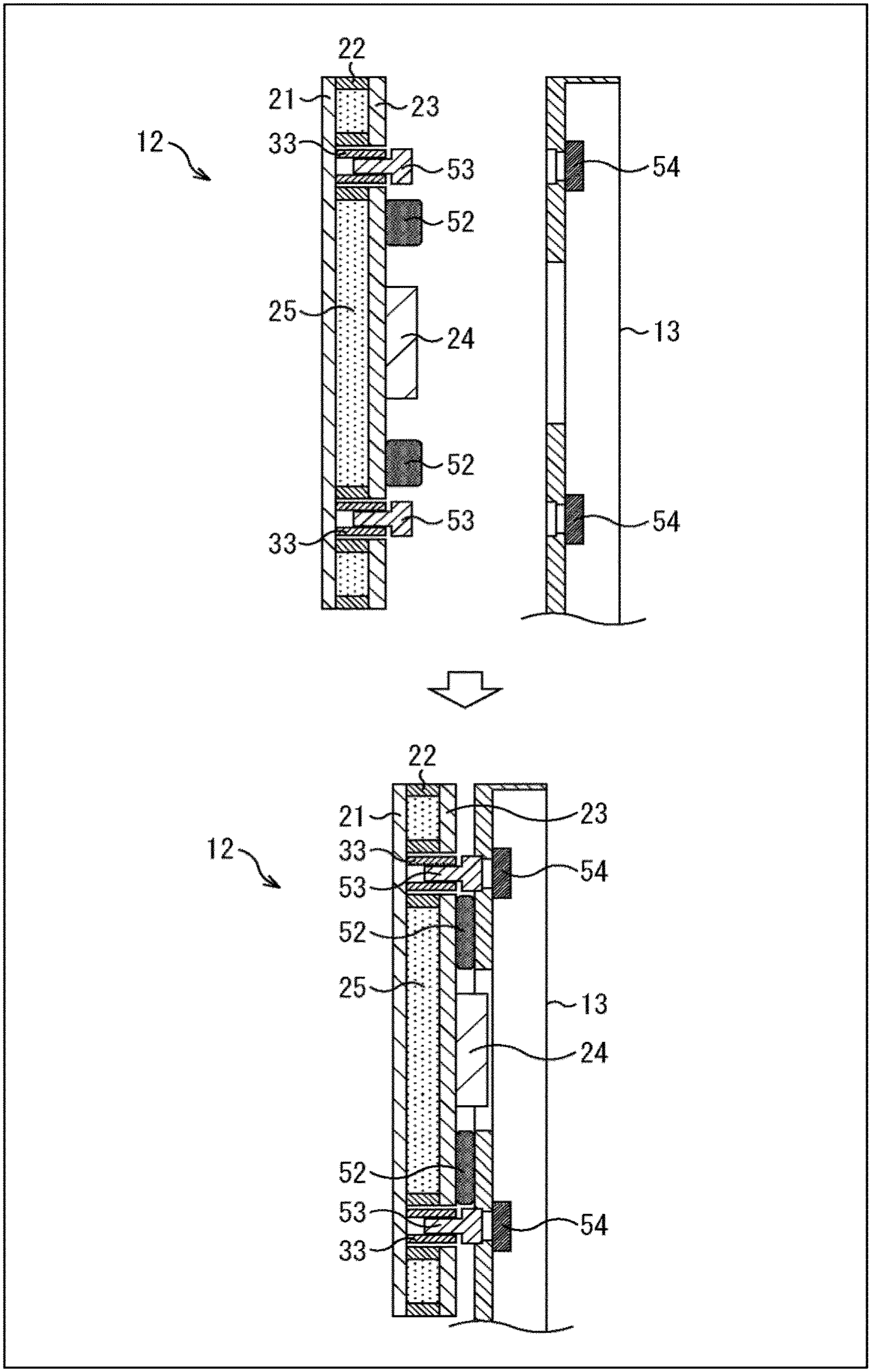
FIG. 6 is a view explanatory of a fixing method using bolts and magnets.

FIG. 6 illustrates an example of a fixing method of fixing the video-audio output module 12 to the main plate 13 using bolts 53 and magnets 54.

As illustrated in FIG. 6, the main plate 13 has counterbores defined therein in alignment with the studs 33 of the video-audio output module 12 and having a recess shape capable of housing the heads of the bolts 53. The magnets 54 are fixed to the side of the main plate 13 that is opposite the counterbores. The bolts 53 are threaded in the respective studs 33 of the video-audio output module 12. When the video-audio output module 12 is brought closer to the main plate 13, the bolts 53 are attracted to the main plate 13 under magnetic forces from the magnets 54. The video-audio output module 12 is fixed to the main plate 13 such that the heads of the bolts 53 are inserted in the respective counterbores of the main plate 13. Note that stepped screws used in place of the bolts 53 are better because their screw heads can have a constant height.

Moreover, according to the fixing method illustrated in FIG. 6, as with the fixing method described with reference to FIG. 5, heat-conductive members 52 are sandwiched between the video-audio output module 12 and the main plate 13.

Variations of heat-conductive members 52 will be described below with reference to FIGS. 7 through 9. Incidentally, in video-audio output modules 12 illustrated in FIGS. 7 through 9, an audio device 24 is omitted from illustration.

Figure 7:
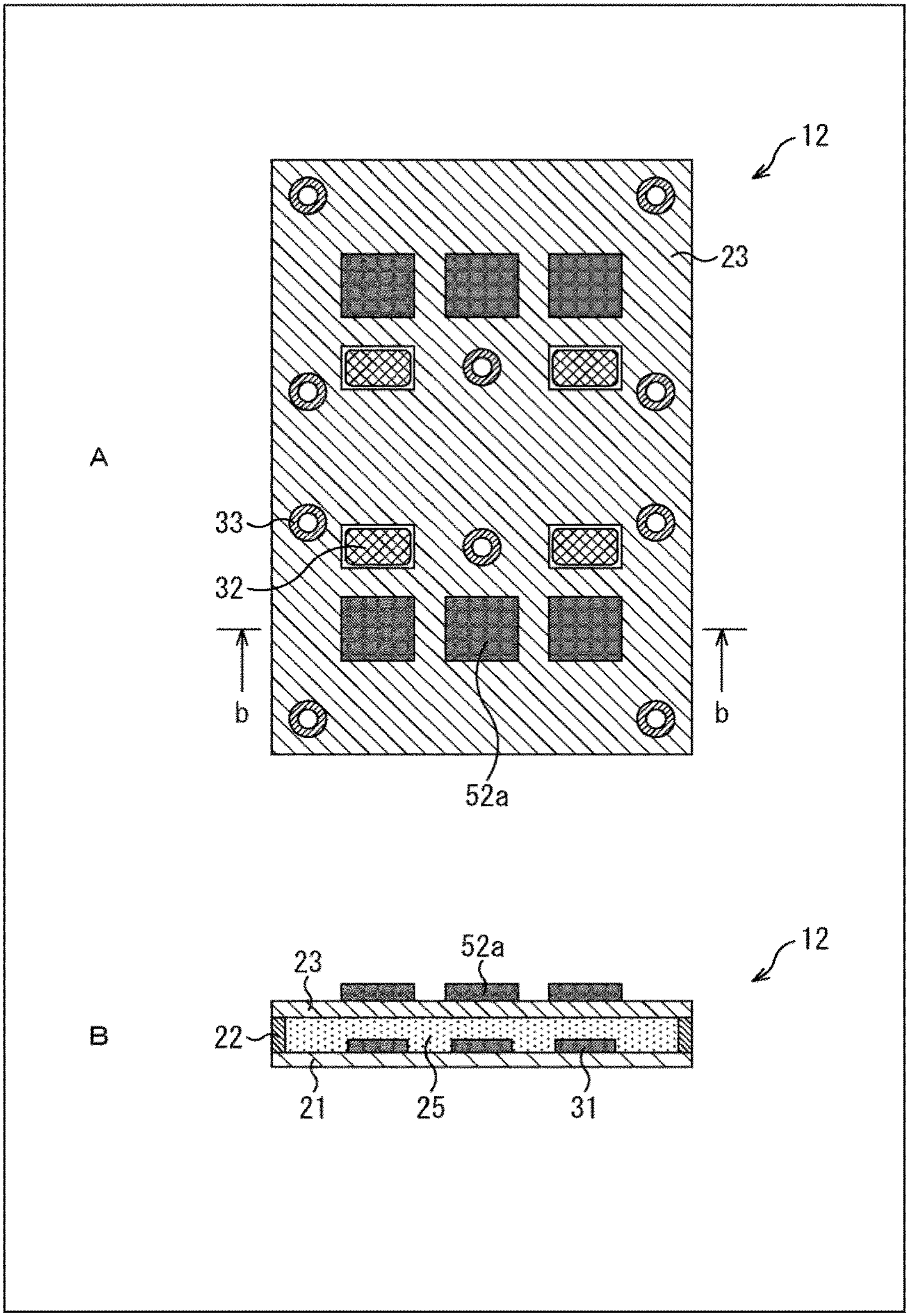
FIG. 7 is a view explanatory of a first variation of heat transfer members.

A in FIG. 7 illustrates an example of a planar structure of a video-audio output module 12 as viewed from its side fixed to a main plate 13. B in FIG. 7 illustrates an example of a sectional structure of the video-audio output module 12 taken along line b-b illustrated in A in FIG. 7.

Heat-conductive members 52*a* according to a first variation illustrated in FIG. 7 each incorporate a thermal foam gasket including graphite that has excellent horizontal heat conductivity. As illustrated in FIG. 7, the heat-conductive members 52*a*, each square-shaped, are affixed to the main plate 13 respectively in six positions, e.g., three positions over an upper tier of drive chips 31 and three positions over a lower tier of drive chips 31, among the drive chips 31 placed in the 3×3 layout illustrated in FIG. 3.

Furthermore, the thermal foam gasket incorporated in each of the heat-conductive members 52*a* includes one graphite sheet layer or multiple graphite sheet layers. For example, each of the heat-conductive members 52*a* may incorporate a thermal foam gasket including one graphite sheet layer or five graphite sheet layers. The thermal foam gasket can have its ability to conduct heat increased by thickening the graphite sheet layer or layers, for example.

Figure 8:
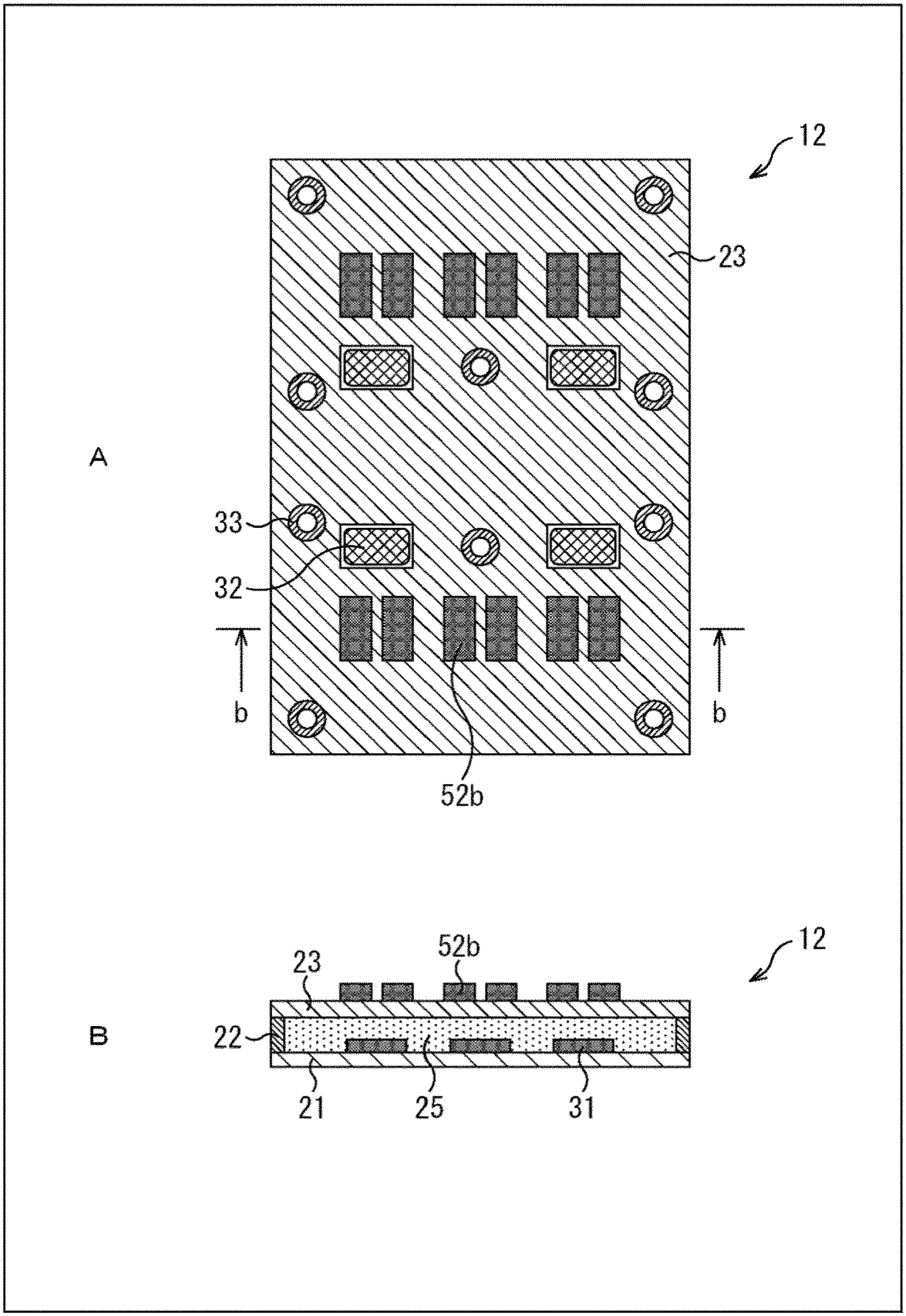
FIG. 8 is a view explanatory of a second variation of heat transfer members.

A in FIG. 8 illustrates an example of a planar structure of a video-audio output module 12 as viewed from its side fixed to a main plate 13. B in FIG. 8 illustrates an example of a sectional structure of the video-audio output module 12 taken along line b-b illustrated in A in FIG. 7.

Heat-conductive members 52*b* according to a second variation illustrated in FIG. 8 each incorporate a thermal foam gasket, as is the case with the heat-conductive members 52*a* illustrated in FIG. 7. Whereas each of the heat-conductive members 52*a* illustrated in FIG. 7 is of a square shape, each of the heat-conductive members 52*a* is of an elongate rectangular shape obtained by dividing a square shape into half, as illustrated in FIG. 8. The thermal foam gasket can have its ability to conduct heat increased by dividing the graphite sheet layer or layers, for example.

Figure 9:
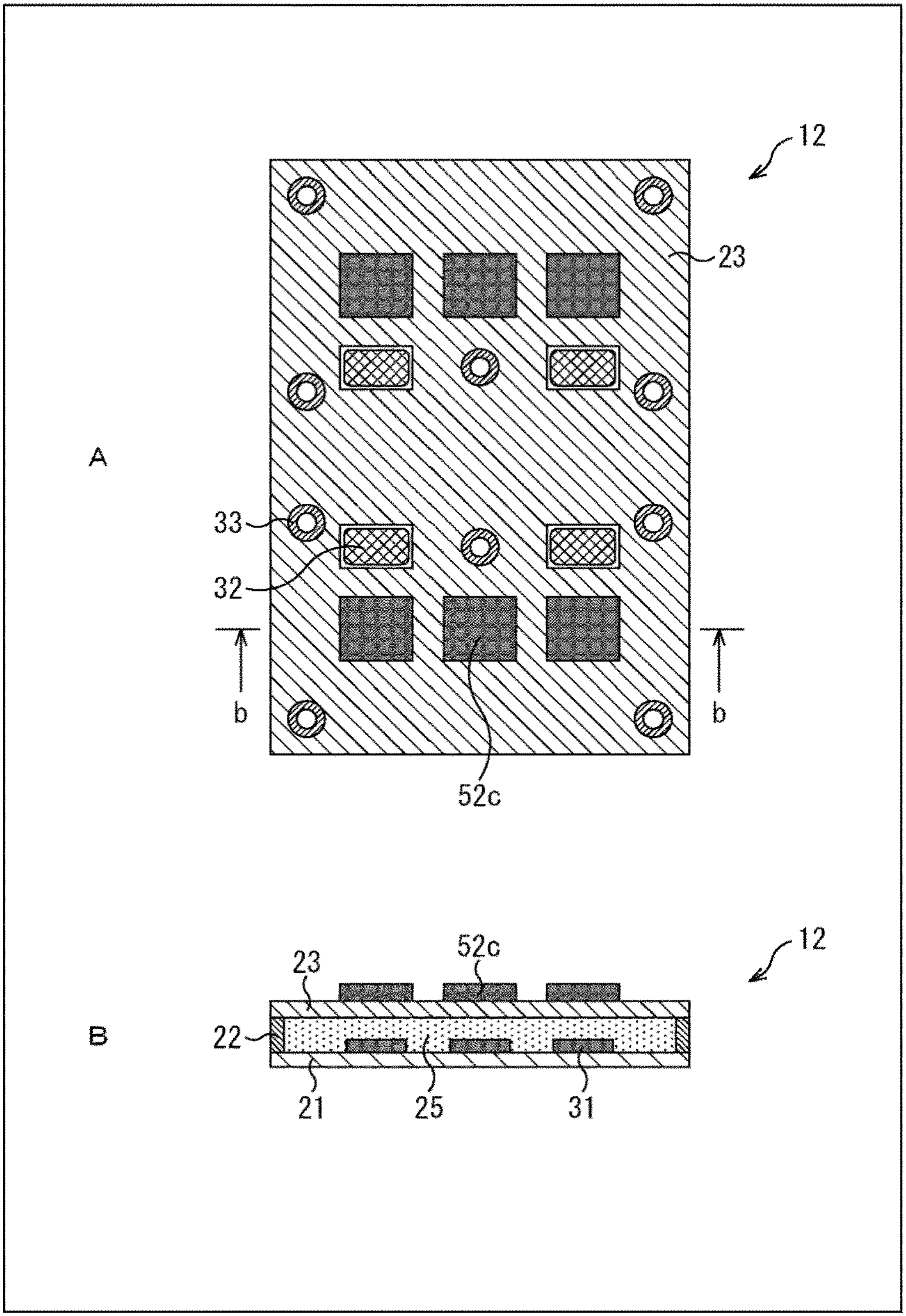
FIG. 9 is a view explanatory of a third variation of heat transfer members.

A in FIG. 9 illustrates an example of a planar structure of a video-audio output module 12 as viewed from its side fixed to a main plate 13. B in FIG. 9 illustrates an example of a sectional structure of the video-audio output module 12 taken along line b-b illustrated in A in FIG. 9.

Heat-conductive members 52*c* according to a third variation illustrated in FIG. 9 each incorporate a heat-conductive sheet having high heat conductivity and flexibility. As illustrated in FIG. 9, the heat-conductive members 52*a*, each square-shaped, are affixed to the main plate 13 respectively in six positions, e.g., three positions over an upper tier of drive chips 31 and three positions over a lower tier of drive chips 31, among the drive chips 31 placed in the 3×3 layout illustrated in FIG. 3.

<Increasing Heat Radiation Capability>

Increasing the heat radiation capability of the heat radiation plate 23 will be described below with reference to FIGS. 10 through 12.

Figure 10:
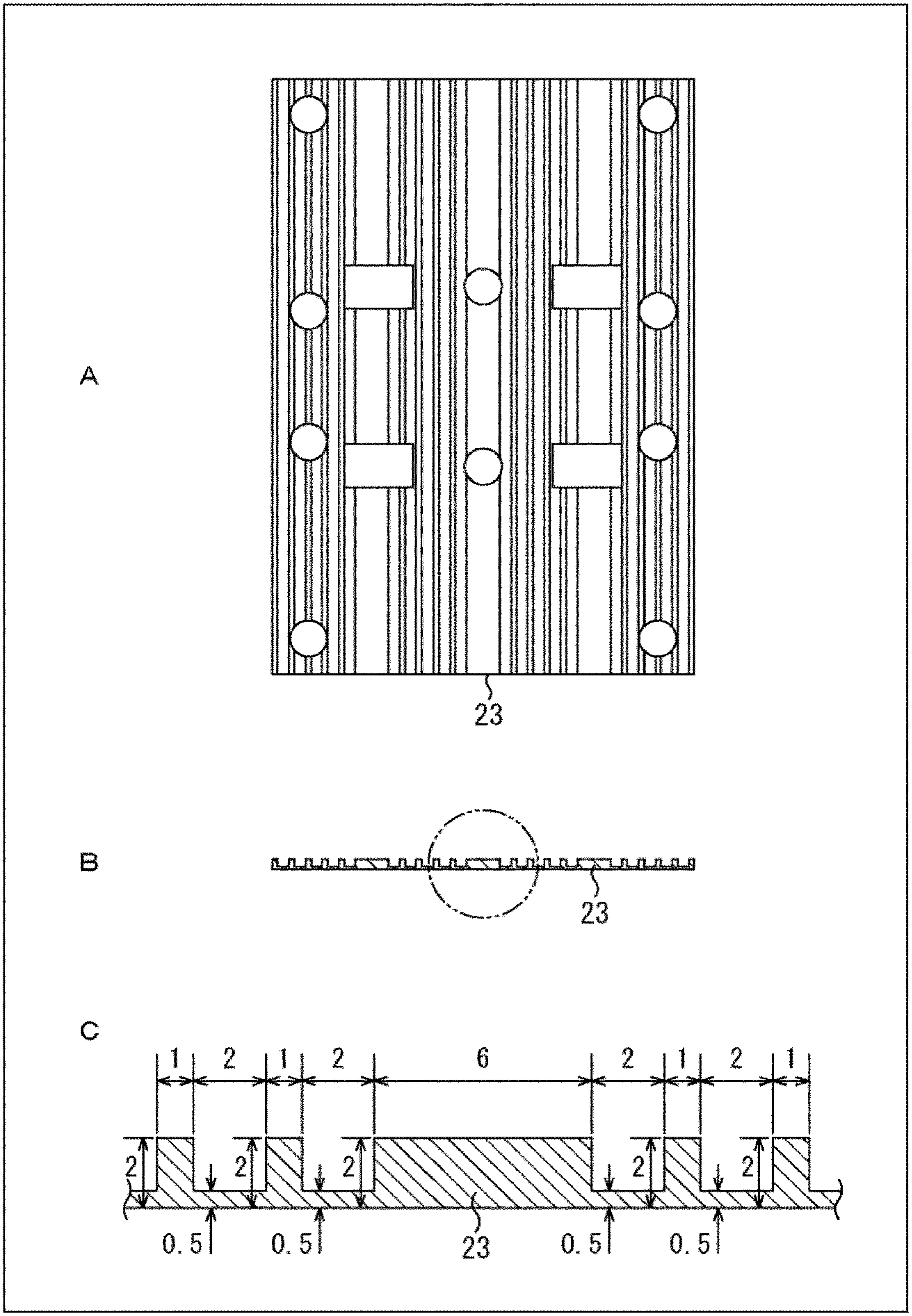
FIG. 10 is a view explanatory of a groove shape of heat transfer members.

FIG. 10 is a view explanatory of a groove shape for increasing the heat radiation capability of the heat radiation plate 23.

A in FIG. 10 illustrates an example of a planar structure of a surface (hereinafter referred to as "outer surface") of the heat radiation plate 23 to which the audio device 24 is affixed. B in FIG. 10 illustrates an example of a sectional structure of the heat radiation plate 23 taken along a line perpendicular to grooves defined in the heat radiation plate 23. C in FIG. 10 illustrates, at an enlarged scale, a sectional structure of a portion of the heat radiation plate 23 that is included in a circle indicated by the two-dot-and-dash line illustrated in B in FIG. 10.

For example, as illustrated in A and B in FIG. 10, grooves each having a width of 2 mm are defined in the outer surface of the heat radiation plate 23 at such pitches as to leave ridges each having a width of 1 mm between the grooves, except for areas in which the adhesive tapes 41 (see A in FIG. 2) are affixed to fix the audio device 24 where groove-free lands each having a width of 6 mm are left.

As illustrated in C in FIG. 10, the heat radiation plate 23 is in the form of an aluminum plate having a thickness of 2 mm with grooves, each having a depth of 1.5 mm, defined in the outer surface of the aluminum plate.

Figure 11:
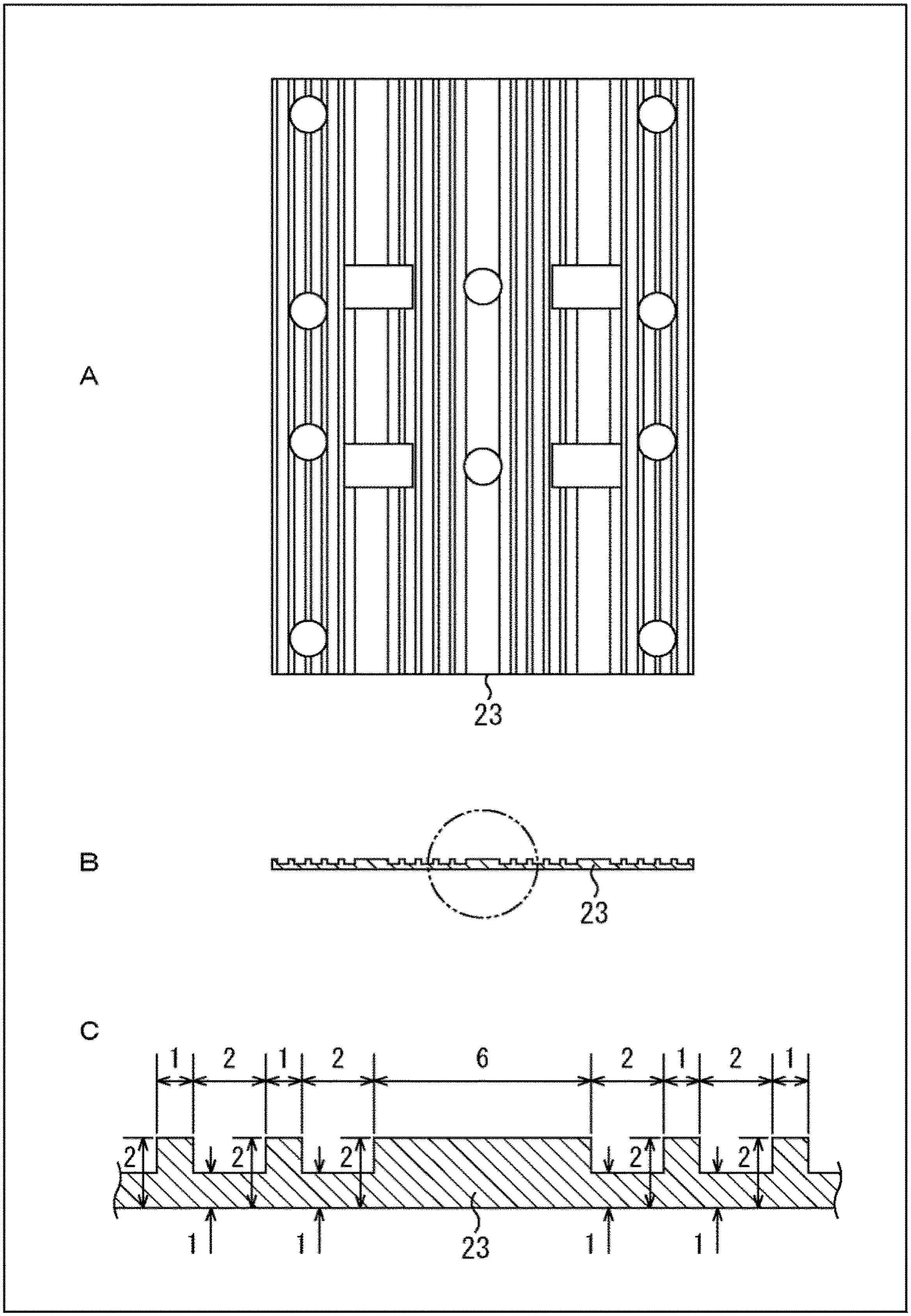
FIG. 11 is a view explanatory of another dimensional example of a groove shape.

FIG. 11 illustrates another dimensional example of grooves defined in the outer surface of the heat radiation plate 23. As illustrated in C in FIG. 11, the heat radiation plate 23 may be in the form of an aluminum plate having a thickness of 2 mm with grooves, each having a depth of 1 mm, defined in the outer surface of the aluminum plate.

In this manner, the heat radiation plate 23 with the groove shape is capable of increasing its heat radiation capability mainly by way of convection. The groove shape reduces the weight and rigidity of the heat radiation plate 23, resulting in an increase in the vibration efficiency thereof that in turn increases the sound pressure of sounds output from the video-audio output module 12.

Figure 12:
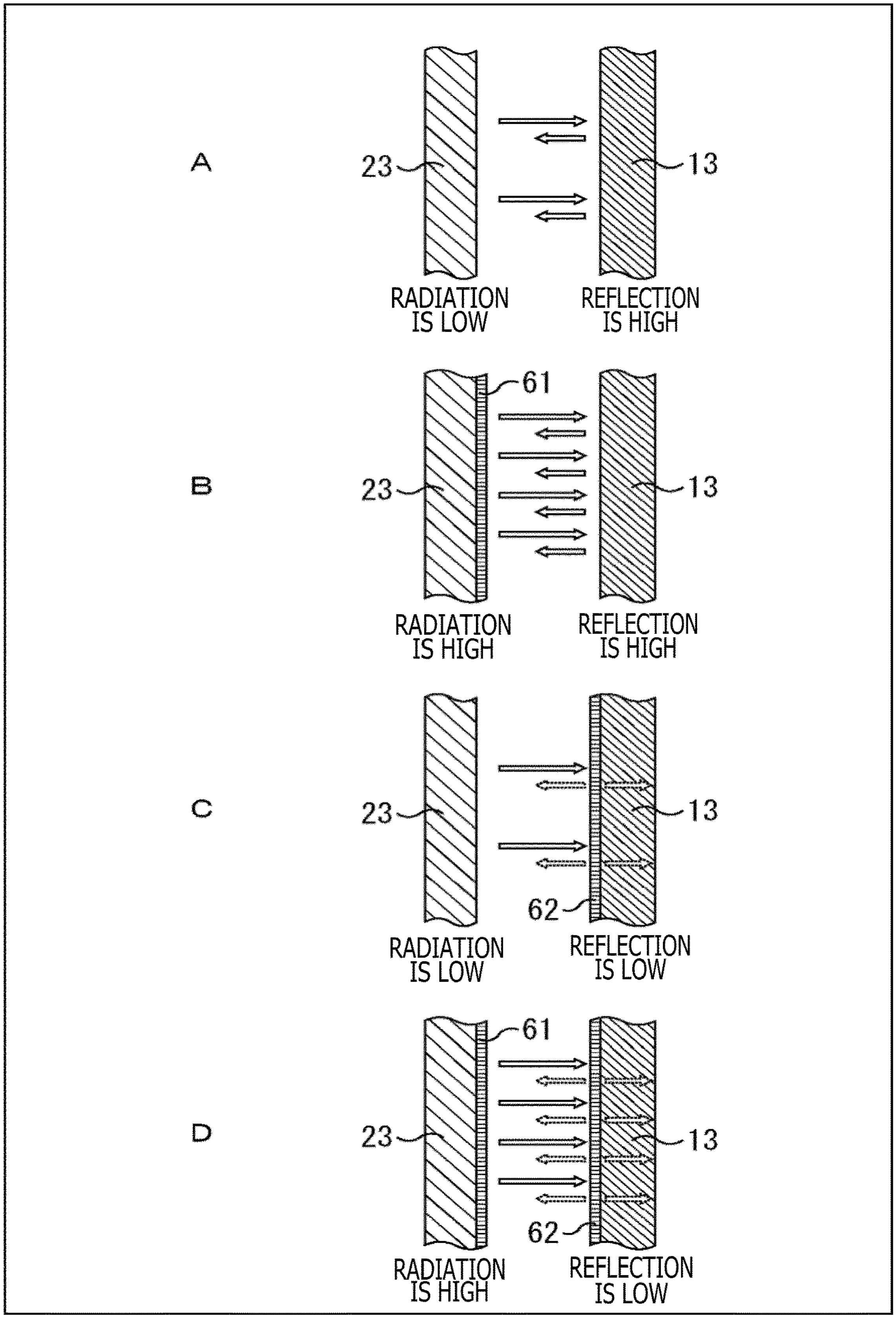
FIG. 12 is a view explanatory of a surface treatment of a heat radiation plate and a main plate.

FIG. 12 is a view explanatory of a surface treatment for increasing the heat radiation capability of the heat radiation plate 23.

In order to increase the heat radiation capability of the heat radiation plate 23, for example, it is considered to perform a surface treatment on the surface of the heat radiation plate 23 to form a surface treatment layer 61 thereon and to perform a surface treatment on the surface of the main plate 13 to form a surface treatment layer 62 thereon. Specifically, it is considered to perform a surface treatment to provide a coating layer, an alumite layer, or the like.

A in FIG. 12 illustrates a combination of the heat radiation plate 23 on which no surface treatment has been performed and hence which is free of a surface treatment layer 61 and the main plate 13 on which no surface treatment has been performed and hence which is free of the surface treatment layer 62. With such a combination, the radiation of heat from the heat radiation plate 23 is lower than if the surface treatment layer 61 is formed on the heat radiation plate 23, and the reflection of heat from the main plate 13 is higher than if the surface treatment layer 62 is formed on the main plate 13. Here, an image indicating that half of the heat radiated from the heat radiation plate 23 is reflected by the main plate 13 is illustrated.

B in FIG. 12 illustrates a combination of the heat radiation plate 23 on which a surface treatment has been performed and hence which has the surface treatment layer 61 formed thereon and the main plate 13 on which no surface treatment has been performed and hence which is free of the surface treatment layer 62. With such a combination, the radiation of heat from the heat radiation plate 23 is higher (twice in the illustrated example) than if the surface treatment layer 61 is not formed on the heat radiation plate 23, and the reflection of heat from the main plate 13 is higher than if the surface treatment layer 62 is formed on the main plate 13. Here, an image indicating that half of the heat radiated from the heat radiation plate 23 is reflected by the main plate 13 is illustrated. The combination illustrated in B in FIG. 12 accounts for the increased heat radiation capability that is approximately twice the heat radiation capability of the combination illustrated in A in FIG. 12.

C in FIG. 12 illustrates a combination of the heat radiation plate 23 on which no surface treatment has been performed and hence which is free of the surface treatment layer 61 and the main plate 13 on which a surface treatment has been performed and hence which has the surface treatment layer 62 formed thereon. With such a combination, the radiation of heat from the heat radiation plate 23 is lower than if the surface treatment layer 61 is formed on the heat radiation plate 23, and the reflection of heat from the main plate 13 is lower than if the main plate 13 is free of the surface treatment layer 62. Here, an image indicating that part (e.g., ¼) of the heat reflected by the main plate 13 free of the surface treatment layer 62 is conducted into the main plate 13 by the surface treatment layer 62 and the remainder of the heat is reflected by the main plate 13 is illustrated. The combination illustrated in C in FIG. 12 accounts for the increased heat radiation capability that is approximately 1.5 times the heat radiation capability of the combination illustrated in A in FIG. 12.

D in FIG. 12 a combination of the on which a surface treatment has been performed and hence which has the surface treatment layer 61 formed thereon and the main plate 13 on which a surface treatment has been performed and hence which has the surface treatment layer 62 formed thereon. With such a combination, the radiation of heat from the heat radiation plate 23 is higher than if the heat radiation plate 23 is free of the surface treatment layer 61, and the reflection of heat from the main plate 13 is lower than if the main plate 13 is free of the surface treatment layer 62. Here, an image indicating that part (e.g., ¼) of the heat reflected by the main plate 13 free of the surface treatment layer 62 is conducted into the main plate 13 by the surface treatment layer 62 and the remainder of the heat is reflected by the main plate 13 is illustrated. The combination illustrated in D in FIG. 12 accounts for the increased heat radiation capability that is approximately three times the heat radiation capability of the combination illustrated in A in FIG. 12.

The heat treatment performed on the heat radiation plate 23 or the heat treatment performed on both the heat radiation plate 23 and the main plate 13 is able to make the video-audio presentation apparatus 11 obtain better heat radiation capability.

Note that the heat radiation capability may be increased by a heat treatment for polishing or oxidizing a surface, other than the heat treatment for forming the surface treatment layer 61 and the surface treatment layer 62.

<Increasing Sound Quality>

A structural example for increasing the sound quality of a video-audio output module 12 will be described below with reference to FIG. 13.

Figure 13:
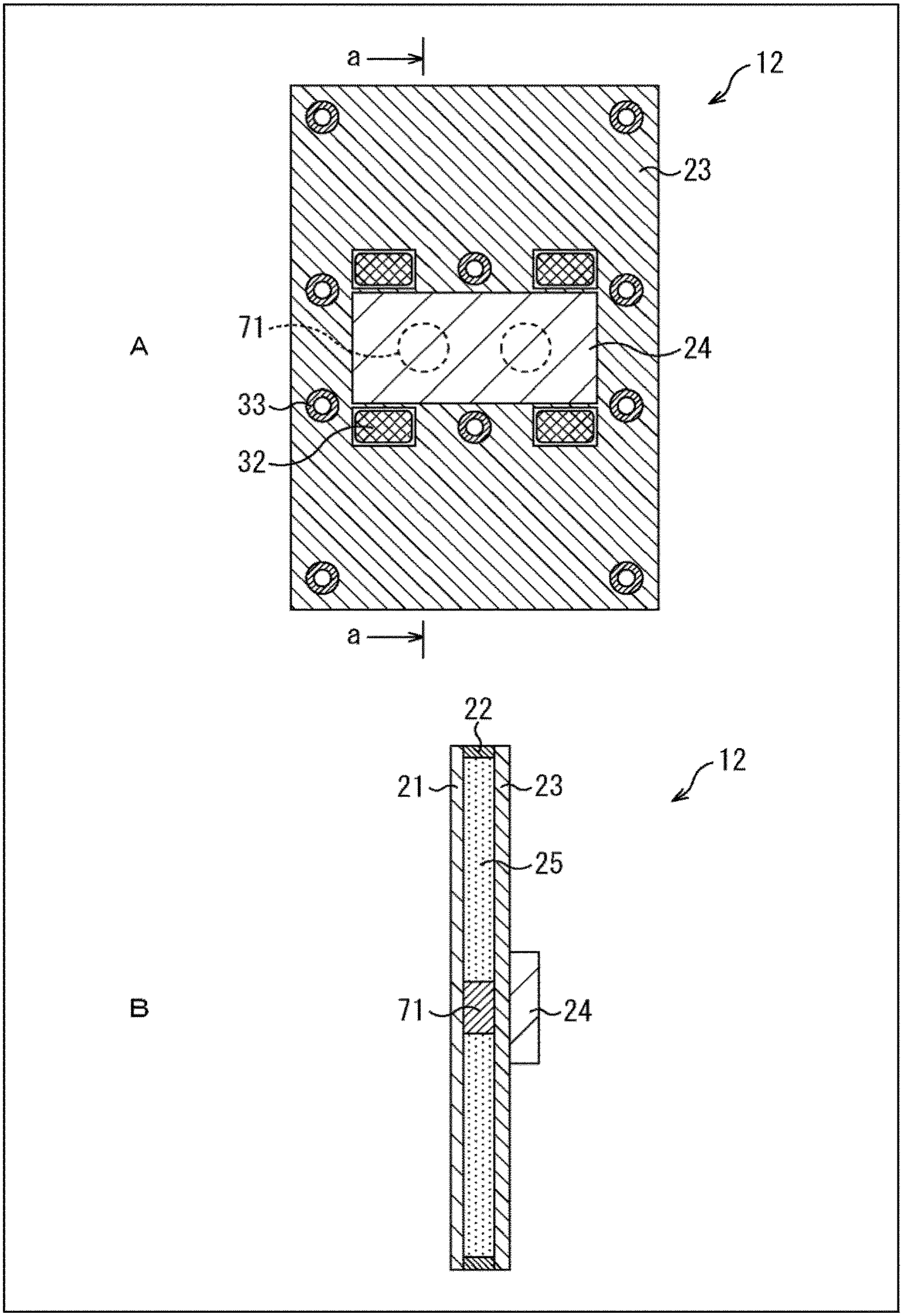
FIG. 13 is a view explanatory of a structural example for improving sound quality.

A video-audio output module 12 illustrated in FIG. 13 includes vibration transmitting members 71 sandwiched between the LED board 21 and the heat radiation plate 23. Each of the vibration transmitting members 71 includes a metal member having the same thickness as the packing 22, for example, and is disposed in a position directly below the audio device 24 (a position underlying the audio device 24 as viewed in plan), as illustrated in A in FIG. 13.

Specifically, the video-audio output module 12 according to the structural example illustrated in FIG. 2 includes the heat-conductive adhesive 25 directly below the audio device 24, and has such a structure that vibrations of the audio device 24 are transmitted through the heat-conductive adhesive 25 to the LED board 21. With this structure, since the heat-conductive adhesive 25 that has been cured has a low degree of hardness, it tends to attenuate the vibrations of the audio device 24 so much that it may be expected for the vibrations not to be sufficiently transmitted to the LED board 21.

Accordingly, as illustrated in FIG. 13, the vibration transmitting members 71 that have a high degree of hardness are disposed in the position directly below the audio device 24 to transmit the vibrations of the audio device 24 reliably to the LED board 21. In this fashion, the sound quality (e.g., frequency characteristics) of the video-audio output module 12 is stabilized, making it possible for the video-audio output module 12 to output sounds of better sound quality.

<Example of Combination of Structure>

Note that the present technology may be implemented in the following structures.

(1)

A video-audio output module including:

a display board having a display surface for displaying a video image and a mount surface facing opposite the display surface, with drive chips mounted on the mount surface for driving the display surface to display the video image;

a heat radiation plate fixed to the mount surface of the display board with a heat-conductive filler material of high heat conductivity interposed therebetween, the heat radiation plate including a material of high heat conductivity; and an audio device fixed to the heat radiation plate, the audio device being vibratable in response to an audio signal applied thereto.

(2)

The video-audio output module according to (1) above, further including:

a packing for preventing the heat-conductive filler material interposed between the display board and the heat radiation plate from leaking, the packing having a thickness equal to or larger than a thickness of the drive chips mounted on the display board.

(3)

The video-audio output module according to (1) or (2) above, further including:

a heat-conductive member configured to be sandwiched between the video-audio output module and a main plate to which the multiple video-audio output modules are to be fixed.

(4)

The video-audio output module according to (3) above, in which the heat radiation plate has multiple grooves defined in a surface thereof to which the audio device is fixed.

(5)

The video-audio output module according to any one of (1) to (4) above, in which a surface treatment is performed on both or either one of the heat radiation plate and the main plate.

(6)

The video-audio output module according to any one of (1) to (5) above, further including:

a vibration transmitting member disposed in a position directly below the audio device between the display board and the heat radiation plate.

(7)

A video-audio presentation apparatus including:

a video-audio output module including a display board having a display surface for displaying a video image and a mount surface facing opposite the display surface, with drive chips mounted on the mount surface for driving the display surface to display the video image, a heat radiation plate fixed to the mount surface of the display board with a heat-conductive filler material of high heat conductivity interposed therebetween, the heat radiation plate including a material of high heat conductivity, and an audio device fixed to the heat radiation plate, the audio device being vibratable in response to an audio signal applied thereto; and a main plate to which the multiple video-audio output modules are fixed in a tiled layout.

(8)

The video-audio presentation apparatus according to (7) above, in which at least one of the multiple video-audio output modules further includes a packing for preventing the heat-conductive filler material interposed between the display board and the heat radiation plate from leaking, the packing having a thickness equal to or larger than a thickness of the drive chips mounted on the display board.

(9)

The video-audio presentation apparatus according to (7) or (8) above, in which at least one of the multiple video-audio output modules further includes a heat-conductive member sandwiched between the video-audio output module and the main plate to which the multiple video-audio output modules are fixed.

(10)

The video-audio presentation apparatus according to any one of (7) to (9) above, in which the heat radiation plate of at least one of the multiple video-audio output modules has multiple grooves defined in a surface thereof to which the audio device is fixed.

(11)

The video-audio presentation apparatus according to (9) above, in which a surface treatment is performed on both or either one of the heat radiation plate and the main plate.

(12)

The video-audio presentation apparatus according to any one of (7) to (11) above, in which at least one of the multiple video-audio output modules further includes a vibration transmitting member disposed in a position directly below the audio device between the display board and the heat radiation plate.

Note that the present disclosure is not limited to the present embodiment described above, and various changes and modifications may be made in the present embodiment without departing from the scope of the present disclosure. The advantageous effects disclosed in the present description are by way of illustrative example only but not restrictive, and other advantageous effects may arise.

REFERENCE SIGNS LIST

11: Video-audio presentation apparatus
12: Video-audio output module
13: Main plate
21: LED board
22: Packing
23: Heat radiation plate
24: Audio device
25: Heat-conductive adhesive
31: Drive chip
32: Connector
33: Stud
41: Adhesive tape
51: Stepped screw
52: Heat-conductive member
53: Bolt
54: Magnet
61, 62: Heat treatment layer
71: Vibration transmitting member

The invention claimed is:

1. A video-audio output module comprising:

a display board having a display surface for displaying a video image and a mount surface facing opposite the display surface, with drive chips mounted on the mount surface for driving the display surface to display the video image;

a heat radiation plate fixed to the mount surface of the display board with a heat-conductive filler material of high heat conductivity interposed therebetween, the heat radiation plate including a material of high heat conductivity; and an audio device fixed to the heat radiation plate, the audio device being vibratable in response to an audio signal applied thereto.

2. The video-audio output module according to claim 1, further comprising:

a packing for preventing the heat-conductive filler material interposed between the display board and the heat radiation plate from leaking, the packing having a thickness equal to or larger than a thickness of the drive chips mounted on the display board.

3. The video-audio output module according to claim 1, further comprising:

a heat-conductive member configured to be sandwiched between the video-audio output module and a main plate to which the multiple video-audio output modules are to be fixed.

4. The video-audio output module according to claim 1, wherein the heat radiation plate has multiple grooves defined in a surface thereof to which the audio device is fixed.

5. The video-audio output module according to claim 3, wherein a surface treatment is performed on both or either one of the heat radiation plate and the main plate.

6. The video-audio output module according to claim 1, further comprising:

a vibration transmitting member disposed in a position directly below the audio device between the display board and the heat radiation plate.

7. A video-audio presentation apparatus comprising:

a video-audio output module including a display board having a display surface for displaying a video image and a mount surface facing opposite the display surface, with drive chips mounted on the mount surface for driving the display surface to display the video image, a heat radiation plate fixed to the mount surface of the display board with a heat-conductive filler material of high heat conductivity interposed therebetween, the heat radiation plate including a material of high heat conductivity, and an audio device fixed to the heat radiation plate, the audio device being vibratable in response to an audio signal applied thereto; and a main plate to which the multiple video-audio output modules are fixed in a tiled layout.

8. The video-audio presentation apparatus according to claim 7, wherein at least one of the multiple video-audio output modules further includes a packing for preventing the heat-conductive filler material interposed between the display board and the heat radiation plate from leaking, the packing having a thickness equal to or larger than a thickness of the drive chips mounted on the display board.

9. The video-audio presentation apparatus according to claim 7, wherein at least one of the multiple video-audio output modules further includes a heat-conductive member sandwiched between the video-audio output module and the main plate to which the multiple video-audio output modules are fixed.

10. The video-audio presentation apparatus according to claim 7, wherein the heat radiation plate of at least one of the multiple video-audio output modules has multiple grooves defined in a surface thereof to which the audio device is fixed.

11. The video-audio presentation apparatus according to claim 9, wherein a surface treatment is performed on both or either one of the heat radiation plate and the main plate.

12. The video-audio presentation apparatus according to claim 7, wherein at least one of the multiple video-audio output modules further includes a vibration transmitting member disposed in a position directly below the audio device between the display board and the heat radiation plate.

* * * * *